United States Patent [19]
Wettstein

[11] Patent Number: 6,129,794
[45] Date of Patent: Oct. 10, 2000

[54] METHOD OF MANUFACTURING A GEAR WHEEL

[75] Inventor: Hans Wettstein, Fislisbach, Switzerland

[73] Assignee: Asea Brown Boveri AG, Baden, Switzerland

[21] Appl. No.: 09/141,539

[22] Filed: Aug. 28, 1998

[30] Foreign Application Priority Data

Sep. 4, 1997 [DE] Germany .............. 197 38 487

[51] Int. Cl.[7] ............................ C21D 9/32
[52] U.S. Cl. ................ 148/586; 148/573; 29/893.35
[58] Field of Search ............... 148/573, 586; 29/893.35

[56] References Cited

U.S. PATENT DOCUMENTS 5,656,106  8/1997  Amateau et al. .......... 148/586

FOREIGN PATENT DOCUMENTS 1003779  3/1957  Germany .
2362977C2  6/1974  Germany .
23 62 977 C2  8/1982  Germany .

OTHER PUBLICATIONS

"Dimensionierung und Fertigung von Grosszahnradern", O. Gans, WT Zeitschrift fur industrielle Fertigung, Spring–Summer 1984, pp. 551–556.

Primary Examiner—Deborah Yee
Attorney, Agent, or Firm—Burns, Doane, Swecker & Mathis, L.L.P.

[57] ABSTRACT

A method of manufacturing a gear wheel including a shaft and a tooth system. The method includes the steps of hardening and annealing the gear wheel, heating the gear wheel to an annealing temperature, spinning the gear wheel when the annealing temperature is reached, spinning the gear wheel while cooling the gear wheel and grinding the gear wheel to a final size. The method allows the manufacture of gear wheels having an increased service life.

9 Claims, 1 Drawing Sheet

METHOD OF MANUFACTURING A GEAR WHEEL

BACKGROUND OF THE INVENTION

1. Field of the Invention

The invention is based on a method of manufacturing a gear wheel.

2. Discussion of Background

In the case of large gear wheels, special material selection and hardening are imperative in order to obtain the requisite properties of the tooth system of the gear wheels with regard to wear resistance and bending fatigue strength. The main manufacturing steps for a gear wheel consist of the forging of the blank, premachining to a predetermined size and material testing, hardening, annealing and finish machining to final size by means of grinding. A martensitic transformation is produced in the surface layer of the gear wheel by the hardening and annealing step and results in compressive residual stresses on the surface and tensile residual stresses in the interior of the wheel. With increasing ratio of length to diameter of the gear wheel, these internal stresses lead increasingly to three-dimensional tensile stresses, which at material defects may lead to stress peaks and spontaneous crack growth.

The stresses of operation, on the one hand as a result of temperature changes and on the other hand as a result of the centrifugal force, are superimposed on the residual stresses and additionally aggravate the situation by virtue of the fact that they can cause cyclic or unstable crack growth. Since the centrifugal-force stresses increase with the speed of the tooth system and the thermal stresses increase with the size, the risk of such problems becomes all the greater, the larger the gear wheel becomes and the more pronounced the crowning of the gear wheel becomes and the faster it rotates.

SUMMARY OF THE INVENTION

Accordingly, one object of the invention, in a method of manufacturing a gear wheel of the type mentioned at the beginning for large gears, is to take appropriate measures in order to increase the service life.

The essence of the invention is therefore that the gear wheel is hardened and annealed, that the gear wheel is brought to annealing temperature again and spun, that the cooled-down gear wheel is spun, and that the tooth system is ground to final size.

The advantages of the invention may be seen, inter alia, in the fact that, by the spinning at annealing temperature, compressive prestresses are produced at the zones which are at risk of crack growth, and these compressive prestresses prevent subsequent crack growth during operation of the gear wheel. Defective gear wheels can be sorted out by the second spinning step, a factor which markedly increases the reliability of the end product. The implementation of the spinning operations in the premachined state instead of in the finished state reduces the loss of value in the event of a defective gear wheel, which has to be sorted out. The efficiency of the manufacture of the gear wheels is markedly increased by avoiding the grinding of defective gear wheels.

Further advantageous refinements follow from the subclaims.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Figure 1:
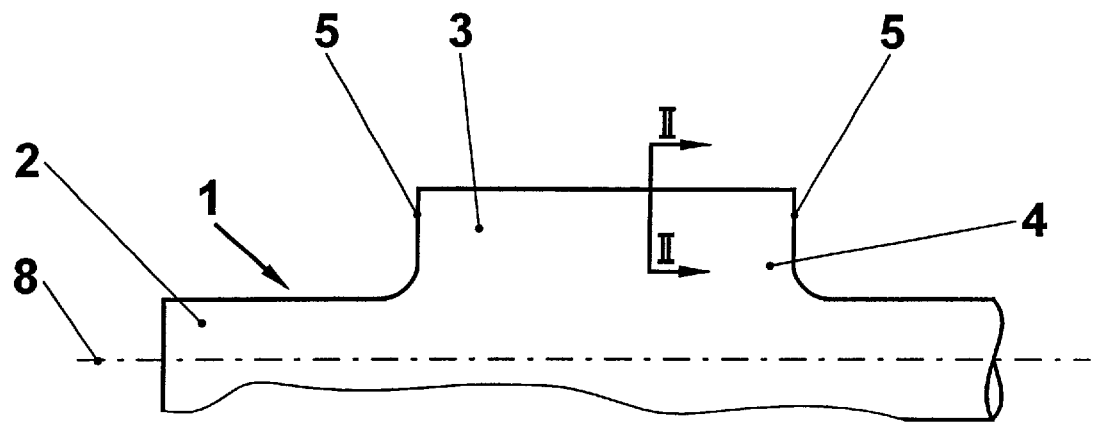
FIG. 1 shows a partial longitudinal section through a gear wheel.
Figure 2:
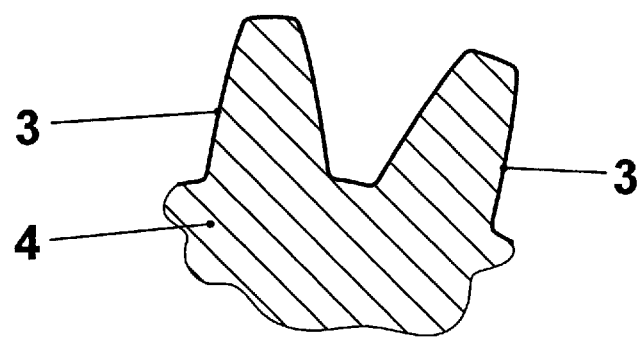
FIG. 2 shows a partial cross section through the gear wheel of FIG. 1 along line II—II.

Referring now to the drawings, wherein like reference numerals designate identical or corresponding parts throughout the several views and only the elements essential for the understanding of the invention are shown, FIGS. 1 and 2 show a gear wheel 1 which essentially comprises a shaft 2, a gear-wheel body 4 and teeth 3, in which case the shaft, the gear-wheel body and the teeth may be made in one piece. The gear wheel 1 rotates about an axis of rotation 8, and the teeth 3 of the gear wheel 1, for the power transmission, mesh at least with the teeth of a further gear wheel (not shown).

The gear wheel 1 is forged, machined to a predetermined size and checked for material defects. This is followed by the surface hardening and annealing. The end faces 5 of the gear wheel 1 are then preferably removed and premachined. The gear wheel 1 is then brought to annealing temperature again. The gear wheel, held at annealing temperature, is put into an explosion-proof spinning hole, preferably in such a way as to be suspended from a vertical spindle, so that the gear wheel 1 can be rotated about its axis of rotation 8. Such explosion-proof spinning holes are known, for example, for powerplant-disk tests. The gear wheel, held at annealing temperature, is then spun at speeds which are higher than the operating speed of the gear wheel, preferably at a speed of approximately 130 to 160% of the operating speed of the gear wheel.

The spinning operation produces a plane stress distribution superimposed on the three-dimensional tensile-stress state produced by the hardening operation. As a result, a yielding phenomenon, encouraged by the elevated temperature level to annealing temperature, occurs at potential inner material defects (imperfections). This leaves compressive prestresses at these zones, which are at risk of crack growth during operation. Subsequent crack growth originating from material defects and caused by the operating cycles of the gear wheel 1 are thereby completely prevented.

Controlled spinning in the same set-up is then carried out at the cooled-down or even supercooled wheel, cooled, for example, to minus 50° C. At the lower temperature, the toughness of the material is so low that the gear wheel 1 can be reliably inspected for defects by this operation, since defective gear wheels would explode during the spinning. After the spinning operation in the cooled-down state, the gear wheel 1 is ground to final size. The implementation of both steps increases both the output and the reliability of the end product. The implementation in the premachined state instead of in the finished state reduces the loss of value in the event of failure of the wheel.

The invention is of course not restricted to the exemplary embodiment shown and described.

Obviously, numerous modifications and variations of the present invention are possible in light of the above teachings. It is therefore to be understood that, within the scope of the appended claims, the invention may be practiced otherwise than as specifically described herein.

What is claimed is:

1. A method of manufacturing a gear wheel, the gear wheel including a shaft and a tooth system comprising the steps of:

hardening and annealing the gear wheel;

heating the gear wheel to an annealing temperature;

spinning the gear wheel when the annealing temperature is reached;

spinning the gear wheel while cooling the gear wheel; and grinding the gear wheel to a final size.

2. The method of manufacturing a gear wheel as claimed in claim 1, further including the step of machining hardened surfaces of end faces of the gear wheel after the step of hardening and annealing and before the step of heating the gear wheel to an annealing temperature.

3. The method of manufacturing a gear wheel as claimed in claim 1, wherein the gear wheel is spun at speeds higher than an operating speed of the gear wheel.

4. The method of manufacturing a gear wheel as claimed in claim 3, wherein the gear wheel is spun at speeds of 130 to 160% of the operating speed of the gear wheel.

5. A gear wheel made by the method as claimed in claim 1.

6. The method of manufacturing a gear wheel as claimed in claim 1, wherein the gear wheel is supercooled during the step of spinning the gear wheel while cooling the gear wheel.

7. The method of manufacturing a gear wheel as claimed in claim 6, wherein supercooling is performed to minus 50° C.

8. The method of manufacturing a gear wheel as claimed in claim 1, wherein the step of spinning the gear wheel while cooling the gear wheel is performed in an explosion-proof spinning hole.

9. The method of manufacturing a gear wheel as claimed in claim 1, wherein the step of spinning the gear wheel when the annealing temperature is reached is performed in an explosion-proof spinning hole.

\* \* \* \* \*